May 2, 1933.  O. E. FISHBURN  1,906,560
OVERRUNNING CLUTCH
Filed Jan. 20, 1930  2 Sheets-Sheet 1

INVENTOR.
Otto E. Fishburn,
BY
Hood + Hahn.
ATTORNEYS

May 2, 1933.  O. E. FISHBURN  1,906,560
OVERRUNNING CLUTCH
Filed Jan. 20, 1930  2 Sheets-Sheet 2
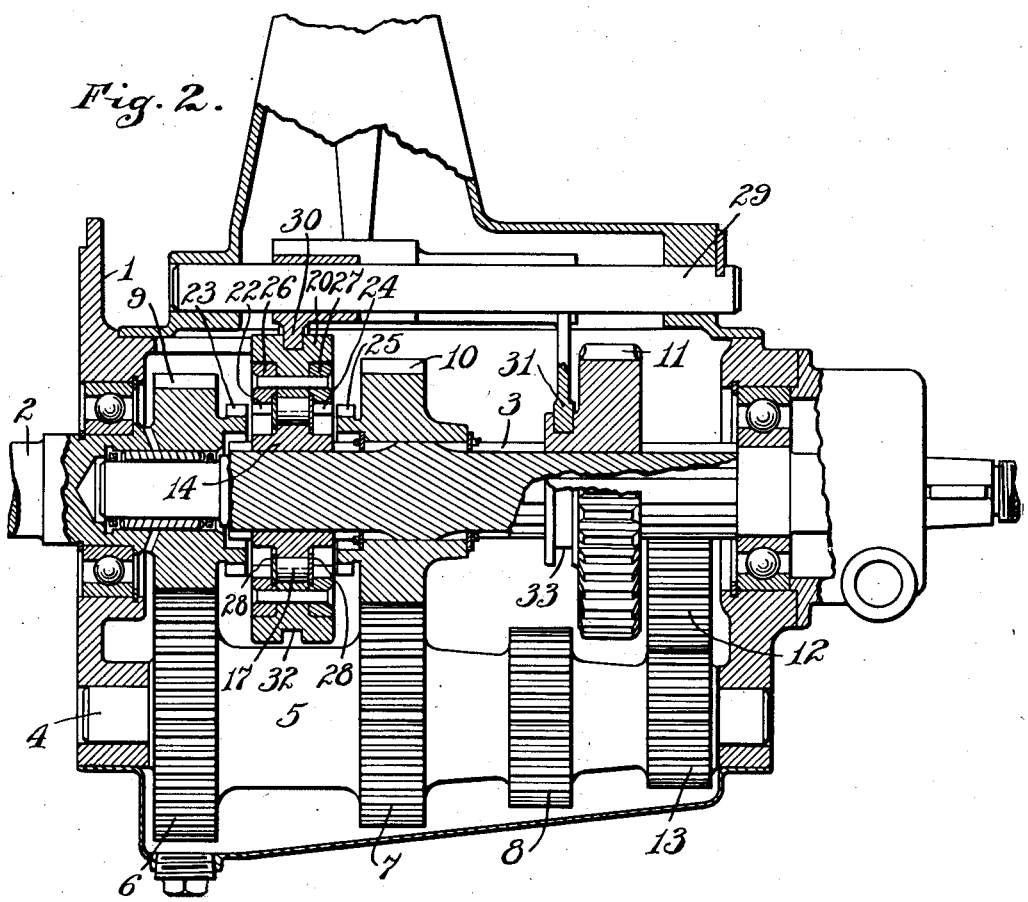
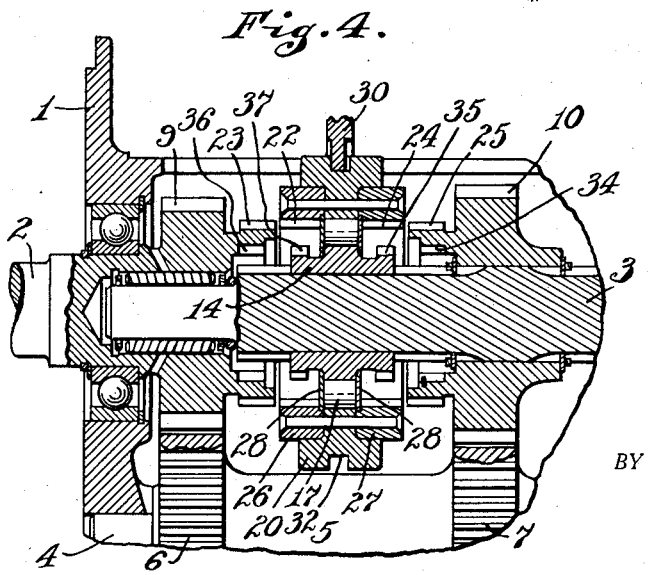
INVENTOR.
Otto E. Fishburn,
BY
Hood + Hahn.
ATTORNEYS Patented May 2, 1933

1,906,560

UNITED STATES PATENT OFFICE

OTTO E. FISHBURN, OF MUNCIE, INDIANA, ASSIGNOR, BY MESNE ASSIGNMENTS, TO FREE WHEELING PATENTS CORPORATION, OF SOUTH BEND, INDIANA, A CORPORATION OF DELAWARE

OVERRUNNING CLUTCH

Application filed January 20, 1930. Serial No. 421,924.

My invention relates to improvements in overrunning clutches and particularly to improvements in that type of clutch which will permit the independent movement of one of the members which it is designed to couple in one direction while causing an interdependent movement of the coupled members in the opposite direction.

My invention is particularly applicable for use in automobile transmissions wherein it is desired to provide means for permitting the driven shaft of the automobile to run independently of the drive shaft when the speed of the driven shaft exceeds that of the drive shaft.

For the purpose of disclosing my invention, I have illustrated one embodiment thereof in the accompanying drawings in which:

Fig. 2 is a longitudinal sectional view of an automobile transmission in which my clutch is embodied;

Fig. 4 is a longitudinal sectional view of a transmission showing still another modified embodiment thereof.

Figure 1:
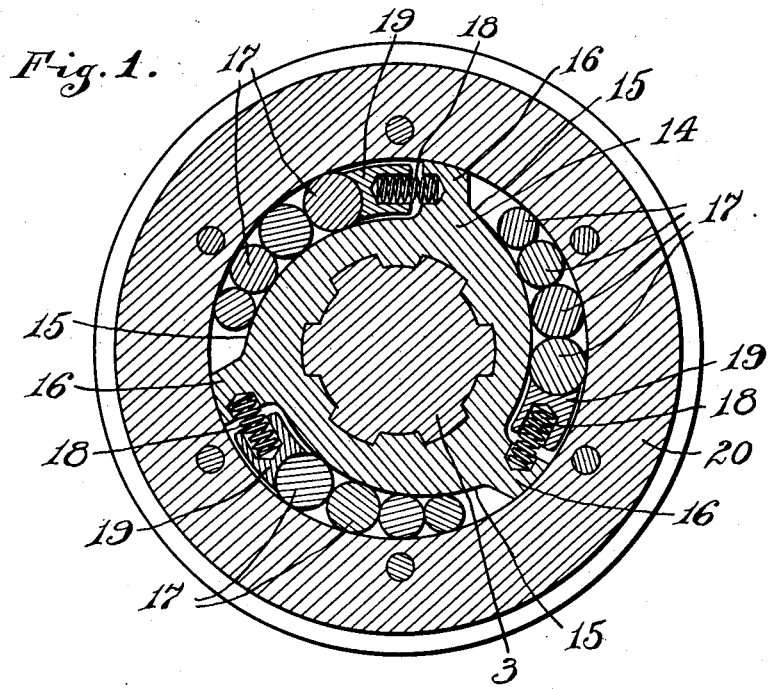
Fig. 1 is a transverse sectional view of a clutch embodying my invention.

In the structure illustrated, I provide a transmission housing 1, which may be of the usual structure and in which there is provided two aligned shafts, the driving shaft 2 and the driven shaft 3. The shaft 2 is connected through the usual clutching mechanism with the engine and the shaft 3 is connected in the usual manner to the propeller shaft of the automobile. In addition to the above shafts, I provide a counter-shaft 4 on which is mounted a sleeve 5 provided with spur gears 6, 7 and 8. The shaft 2 is provided with a driving spur gear 9 adapted to mesh with the spur gear 6. The shaft 3 is provided with a spur gear 10 which is mounted to rotate freely on the shaft and is adapted to mesh with the spur gear 7. For low speed and reverse drive, I provide a spur gear 11 on the shaft 3 which is splined thereon and is adapted to mesh, for low speed with the gear 8, and for reverse drive with the reversing idler 12 driven from the gear 13 on the sleeve 5.

Splined on the shaft 3 and between the gears 9 and 10 is a hub 14 having formed in the periphery thereof a plurality of cammed recesses 15. Each of these recesses occupies a considerable portion of the periphery of the hub, there being preferably three recesses divided by the radial arms 16. Each of the recesses is adapted to receive a plurality of rollers 17 consisting of a series of abutting rollers gradually diminishing in diameter from approximately the deepest portion of the recess to approximately the shallowest portion of the recess. In the present instance, I provide four of such rollers. These rollers are biased up the cammed surface of the recesses by coiled springs 18 interposed between the projection 16 and a sliding plug 19 against which the last of the series of rollers is adapted to abut. These rollers react against the inner face of a drum 20 mounted on the hub and this structure constitutes a one way clutch. The diameter of the rollers is governed by the nature of the eccentric arc or cammed surface, on which they operate, and this eccentric is the arc of a circle struck from a center eccentrically located with respect to the concentric inner circular surface of the drum 20. By this arrangement the load is divided between the rollers. The drum 20 is provided with internal teeth 22 adapted to mesh when the structure is moved to the left, Fig. 2, with the external teeth 23 formed on the hub of the gear 9. A similar set of teeth 24 is provided on the opposite face of the drum, which teeth are adapted to mesh, when the structure is moved to the right, with the external teeth 25 of the gear 10, it being noted that the gear 10 is in constant mesh with the gear 7. The teeth 22 and 24 are in practice formed on annular rings 26 and 27 respectively, which are secured to the drum 20 by means of rivets or bolts and plates 28 held in position by these rings maintain the rollers 17 within their respective recesses.

The usual shifter rails 29 are provided, which rails have shifter forks 30 and 31, the fork 30 being adapted to operate in an annular groove 32 in the hub 20 to shift this structure, and the fork 31 is adapted to operate in a groove 33 on the gear 11 for the purpose of shifting this gear. These shifter rails are operated by a single shifter lever 38 which as usual in structures of this kind has a universal mounting in the housing 39 and is adapted to manipulate either of the rails 29. By this arrangement the single shifter lever 38 is adapted to connect the overrunning clutch mechanism either with the gear 10 or with the drive shaft 2 and as shown in Fig. 4 to so manipulate the mechanism that when desired the overrunning clutch feature may be "locked out".

When the gear 11 is in mesh with the gear 8, the shaft 3 is driven at low speed from the gear 9 through the gears 6, 8 and 11. For driving the shaft 3 at second speed the clutch members 24 are shifted into engagement with the clutch members 25 thereby locking the gear 10 to the shaft 3 and this shaft is then moved at second speed through the gears 9, 6, 7 and 10. As long as the engine is driving the shaft 3 the rollers 17 will tend to ride up the cammed surface locking the hub 14 and the drum 20 together thereby driving the shaft 3 from the gear 9. If, however, the shaft 3 rotates faster than the engine shaft 2, the hub 14 will rotate faster than the hub 20 and the rollers 17 will move toward the deeper portion of the recess in the hub permitting the shaft 3 to run free of the engine shaft.

To drive the shaft 3 at high speed the clutch members 22 are shifted into engagement with the clutch members 23 thereby driving the drum 20 from the shaft 2 and the action of the clutch will be the same as heretofore described.

While I have shown the cammed surface and roller recesses in the hub member 14, it is obvious that instead of this arrangement the roller recesses with the cammed surface may be formed in the inner faces of the hub 20.

Figure 3:
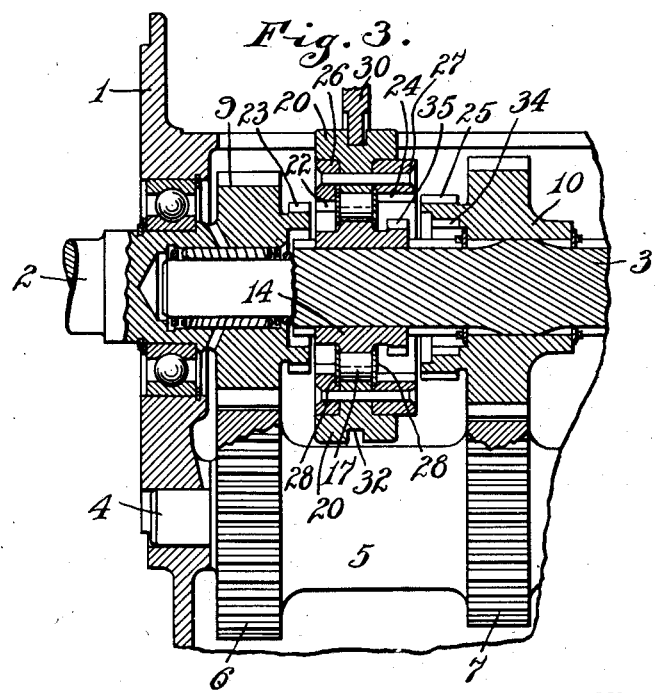
Fig. 3 is a longitudinal section showing a modified embodiment of my invention.

In Fig. 3, I have illustrated a modification whereby, if desired, the next to high speed gear may be connected directly to the driven shaft so that the overrunning clutch, when the automobile is operated at next to high speed, may be rendered ineffective. The teeth 25 on the gear 10 have a greater longitudinal extent and in addition to these teeth there is provided a set of internal teeth 34, the length of the teeth, however, being somewhat shorter than the teeth 25. The hub 14 is provided with a series of external teeth 35 adapted to mesh, when the hub is moved to its limit to the right, with the teeth 34. The teeth 24 on the drum 20 are longer and project beyond the teeth 35 so that the teeth 24 and 25 may be engaged by a partial movement of the drum to the right without engaging the teeth 34 and 35. Under these conditions the gear 10 is connected to the driven shaft 3 through the overrunning clutch. When, however, the hub 14, and its associated parts, are moved to the right, to its limit, the teeth 34 and 35 will be engaged thereby directly connecting the gear 10 to the shaft and rendering the overrunning clutch ineffective.

In Fig. 4, I have illustrated a further modification wherein, when the shafts 2 and 3 are directly connected, the overrunning clutch may be rendered ineffective, when desired. In this structure, the teeth 22 and 23 are made longer as are the teeth 24 and 25 and the gear 9 is provided with a set of internal teeth 36 and the hub 14 with an additional set of external teeth 37, the teeth 34 and 35 being provided as in Fig. 3. In this structure, the drive through gear 10 is the same as in Fig. 3. When it is desired to drive at high speed the teeth 23 and 22 are initially engaged without engaging the teeth 36 and 37. Under these circumstances, the drive is directly from the driving shaft 2 through the overrunning clutch to the driven shaft 3. If, however, the hub member 14 is moved to the limit to the left the teeth 36 and 37 are engaged thereby rendering the overrunning clutch ineffective and directly connecting the shafts 2 and 3 through the hub 14.

I claim the following:

1. In combination, a driving shaft, a driven shaft, and a lay shaft, a pair of gears on said lay shaft operating in unison, a driving gear on said driving shaft constantly meshing with one of said lay shaft gears, a driven gear rotatably mounted on the driven shaft constantly meshing with the other lay shaft gear, and an overrunning clutch for connecting said driven shaft gear to its shaft including an inner rotary member and an outer rotary member, one of said members having a recess in the surface thereof, the bottom of which is eccentric to the surface of the other member and having a plurality of wedging members which gradually decrease in size arranged in said recess.

2. In combination, a driving shaft, a driven shaft and a lay shaft, said lay shaft having a pair of gears operating in unison, a driving gear on said driving shaft in constant mesh with one of the gears of said lay shaft, a driven gear rotatably mounted on said driven shaft in constant mesh with the other lay shaft gear, and an overrunning clutch for connecting said driven shaft gear to its shaft or for connecting the driving shaft to the driven shaft including an inner rotary member and an outer rotary member, one of said members having a recess in the surface thereof, the bottom of which is eccentric to the surface of the other member, and a plurality of wedging members which gradually decrease in size arranged in said recess.

3. In a transmission, the combination with a drive shaft and a driven shaft, of a gear train including high, second, low and reverse speed drives for said driven shaft, an overrunning clutch on said driven shaft, means for selectively connecting said shafts through said overrunning clutch either in said high or second speed drive or for connecting said shafts in said high or said second speed drive independently of said overrunning clutch, means for connecting said shaft in second and reverse drive and a single shift lever for selectively operating said means.

4. In a transmission, the combination with a drive shaft and a driven shaft, of a lay shaft, a gear on said drive shaft, a gear rotatably mounted on said driven shaft, gears on said lay shaft in constant mesh with the drive and driven shaft gears, an overrunning clutch mounted on said driven shaft independently of said rotatable gear and axially shiftable means for connecting said drive shaft or rotatable gear to the driven shaft through said overrunning clutch.

5. In a transmission, the combination with a drive shaft and a driven shaft, of a lay shaft, a gear on said drive shaft, a gear rotatably mounted on said driven shaft, gears on said lay shaft in constant mesh with the drive and driven shaft gears, an overrunning clutch mounted on said driven shaft independently of said rotatable gear, axially shiftable means for connecting said drive shaft or rotatable gear to the driven shaft through said overrunning clutch or independently of said overrunning clutch.

6. In a transmission, the combination with a drive shaft and a driven shaft, of a lay shaft, a gear on said drive shaft, a gear rotatably mounted on said driven shaft, gears on said lay shaft in constant mesh with the drive and driven shaft gears, an overrunning clutch mounted on said driven shaft independently of said rotatable gear, axially shiftable means for progressively connecting either said rotatable gear or the drive shaft to the driven shaft first through said overrunning clutch and then independently thereof.

7. In a vehicle transmission, a second speed effecting gear driven by the vehicle engine, a shaft, a driving member non-rotatably mounted on said shaft, a gear member rotatably mounted on said shaft, an overrunning clutch for connecting said driving member and rotatable gear and means for shifting said driving member axially in one direction from a neutral position to progressively effect first an overrunning drive between said second speed gear and said shaft and then a positive drive between said gear and shaft.

8. In a vehicle transmission, a gear driven by the vehicle engine, a shaft, a driving member non-rotatably and slidably mounted on said shaft, a gear member rotatably mounted on said shaft, an overrunning clutch for connecting said driving member and rotatable gear and means for shifting said driving member axially in one direction from a neutral position to progressively effect first an overrunning drive between the positively driven gear and said shaft and then a positive drive between said gear and shaft.

9. In a vehicle transmission, a reduced speed effecting gear driven by the vehicle engine, a shaft, a driving member non-rotatably and slidably mounted on said shaft, a gear member rotatably mounted on said shaft, an overrunning clutch for connecting said driving member and rotatable gear and means for shifting said driving member axially in one direction from a neutral position to progressively effect first an overrunning drive between said reduced speed gear and shaft and then a positive drive between said gear and shaft.

10. In a vehicle transmission, a reduced speed gear driven by the vehicle engine, a splined shaft, a correspondingly driving member splinedly mounted on said shaft, a gear member rotatably mounted on said shaft, an overrunning clutch for connecting said driving member and rotatable gear and means for shifting said driving member axially in one direction from a neutral position to progressively effect an overrunning drive between said reduced speed gear and said shaft and then a positive drive between said gear and shaft.

In witness whereof, I, OTTO E. FISHBURN, have hereunto set my hand at Muncie, Indiana, this 16th day of December, A. D. one thousand nine hundred and twenty nine.

OTTO E. FISHBURN.